UNITED STATES PATENT OFFICE.

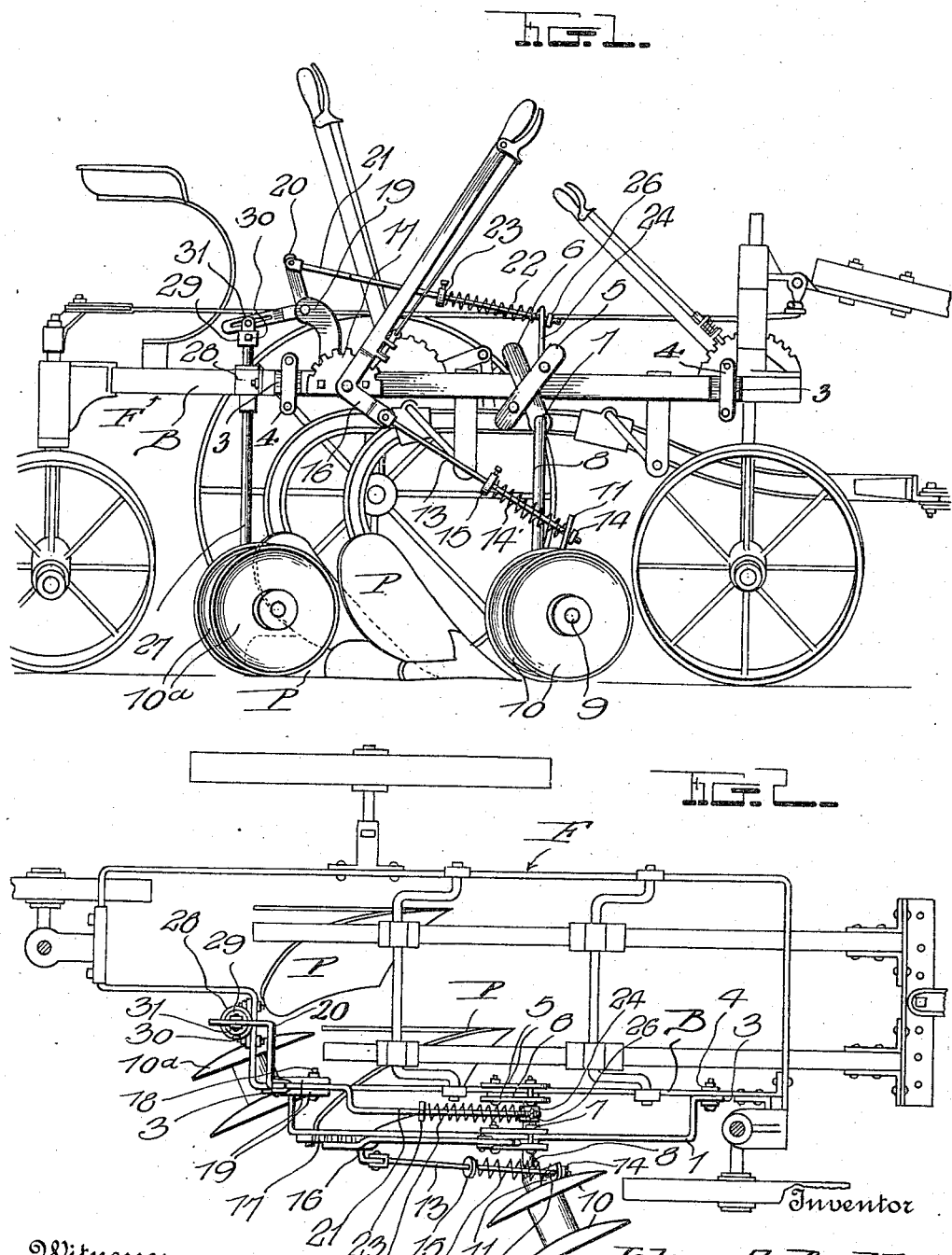

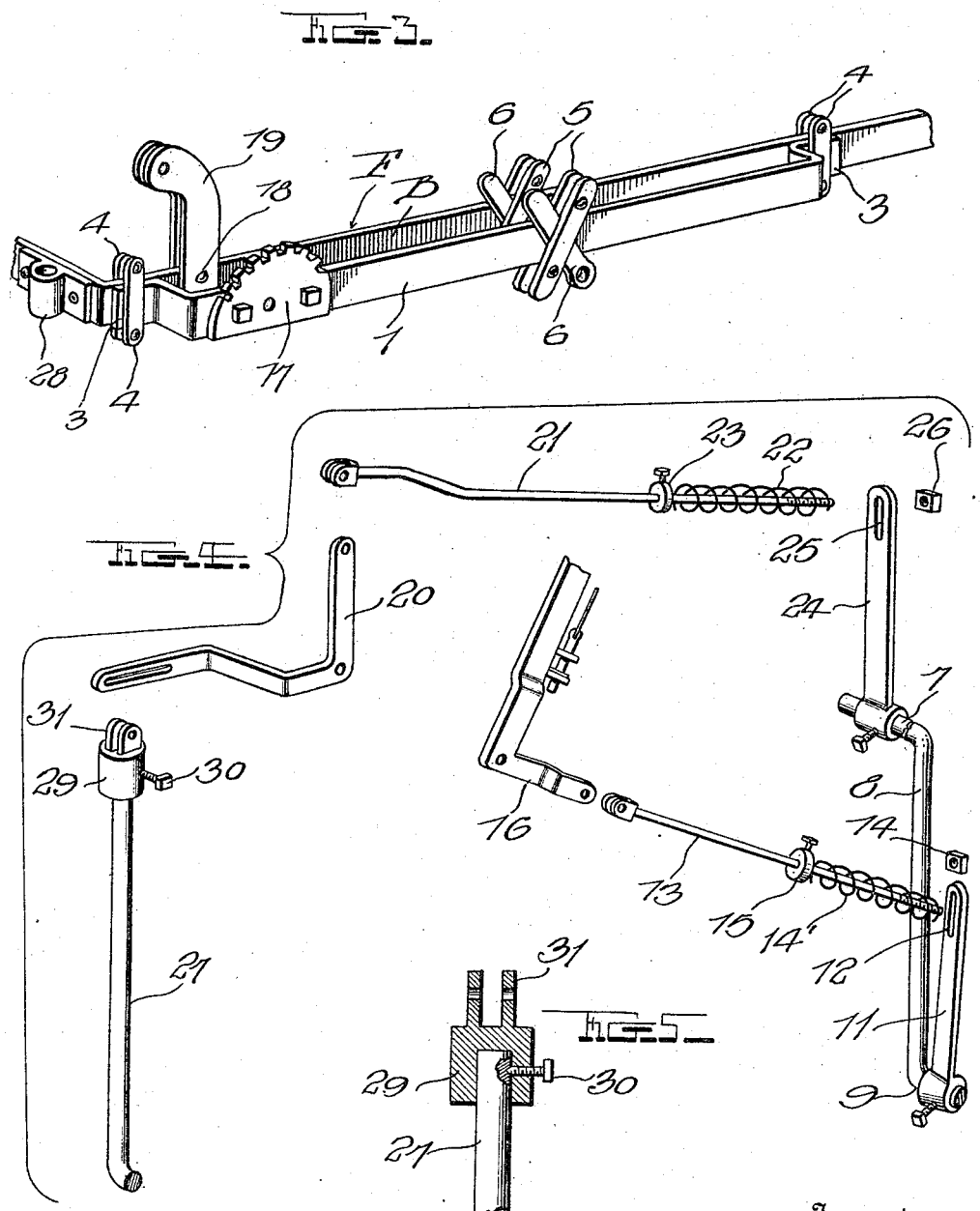

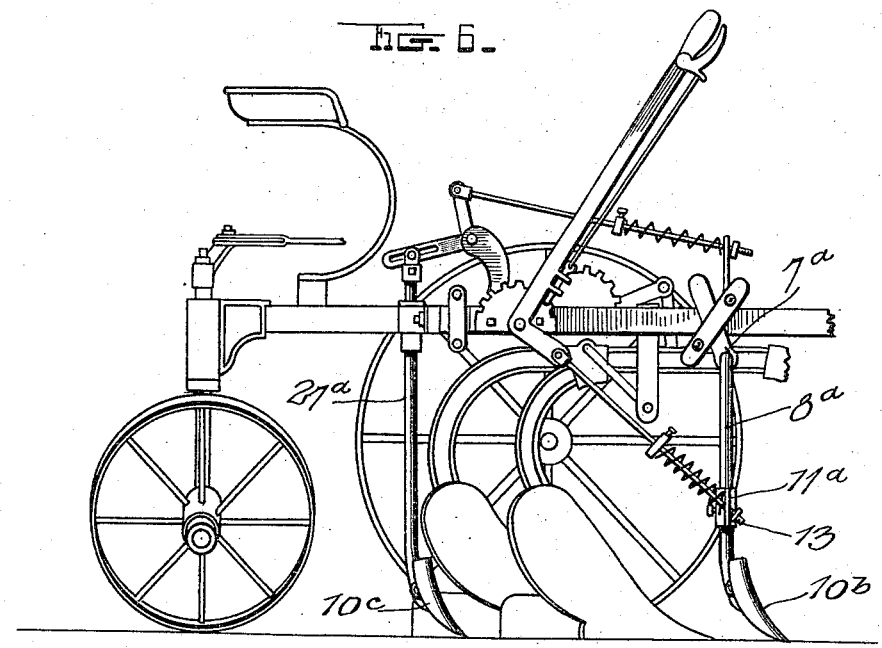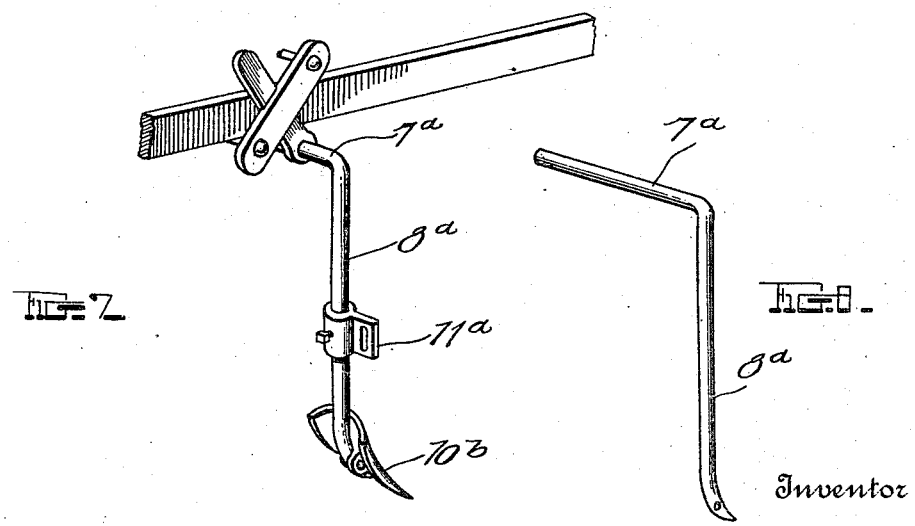

JOHN A. BELTZ, OF REYNOLDS, NORTH DAKOTA, ASSIGNOR OF ONE-HALF TO WILLIAM H. HEMMY, OF REYNOLDS, NORTH DAKOTA.

ATTACHMENT FOR GANG-PLOWS AND THE LIKE.

1,187,488.  Specification of Letters Patent.  Patented June 20, 1916.

Application filed August 5, 1915. Serial No. 43,843.

*To all whom it may concern:*

Be it known that I, JOHN A. BELTZ, a citizen of the United States, residing at Reynolds, in the county of Traill and State of North Dakota, have invented certain new and useful Improvements in Attachments for Gang-Plows and the like; and I do declare the following to be a full, clear, and exact description of the invention, such as will enable others skilled in the art to which it appertains to make and use the same.

My invention relates broadly to improvements in agricultural implements and more particularly to subsoiling attachments for sulky and gang plows, the object of the invention being to provide a device of this class which although being very simple in construction and readily attachable to most types of plows of the class set forth, will be highly efficient and durable in operation.

With this object in view, the invention resides in certain novel features of construction and in the unique combinations of parts hereinafter claimed and described by reference to the accompanying drawings wherein:

Figure 1 is a side elevation of a gang plow showing the application of the invention thereto; Fig. 2 is a top plan view; Fig. 3 is a perspective view of a portion of a plow frame and the parts of the attachment rigidly secured thereto; Fig. 4 is a disassembled perspective view of the movable parts of the attachment; and Fig. 5 is a detail vertical section through the cap on the upright implement carrying shaft; Fig. 6 is a view similar to Fig. 1 showing a slightly different form of construction; Fig. 7 is a detail perspective view of certain parts disclosed in Fig. 6; and Fig. 8 is a similar view of the rock shaft detached from the machine.

In these drawings from Figs. 1 to 5 inclusive, F indicates the frame of a gang plow having the two plows indicated at P, these parts as well as all others of the machine being of common construction and being merely illustrated for the purpose of disclosing the application of the invention to use. Spaced laterally from one of the longitudinally disposed horizontal side bars B of the frame F, lying parallel thereto and disposed in the same horizontal plane therewith, is the longitudinally disposed bar 1 having its opposite ends bent laterally inward toward the bar B and then extended longitudinally to provide feet 3 contacting with said bar B to which they are secured by appropriate clamps 4. Secured by appropriate clamps 5 to the front end of the bar 1 and to the portion of the bar B immediately opposite the same, is a pair of substantially upright bars 6 having bearings at the lower end in which a transverse horizontally disposed rock shaft 7 is mounted, said shaft having a depending arm 8 carrying a horizontally disposed forwardly and laterally extending axle 9 upon which a pair of subsoiling disks 10, or rather the hub of said disks is rotatably mounted. The axle 9 is provided near its inner end with an upstanding ear 11 having therein a vertically elongated slot 12 through which the front end of an upwardly and rearwardly inclined link 13 passes, the portion of said end projecting forwardly from the ear 11 being provided with a nut 14, while bearing against the rear side of said ear, extending rearwardly therefrom, and surrounding the link 13, is the coil spring 14' whose rear end bears against the stop collar 15 adjustable longitudinally upon the aforesaid link 13. The rear end of this link is preferably forked and is pivoted to the lower end of an L-shaped lever 16 which is fulcrumed at its angle to the rear end of the bar 1, the latter being equipped at this point with a segmental rack 17 engaged by an appropriate pawl carried by the lever to lock the latter in adjusted position.

The construction so far described may be used to advantage on sulky plows having but one plow since the subsoiling disks 10 loosen the bottom of the last furrow plowed, previously to turning the earth from the next furrow into the same. During this operation, should a rock or the like be struck by the disks, the crank arm 8 may yield rearwardly against the tension of the spring 14', thus preventing breakage of any parts of the machine. When the obstruction has been passed, this spring will return the disks to their normal active positions and the operation thereof will continue. When, however, the invention is to be applied to a gang plow, it is necessary to augment the construction above described in the manner now to be set forth.

Secured by a bolt 18 or by any other preferred means to a portion of the bar B directly opposite the rear end of the bar 1, and contacting with the opposite sides of the former, is the pair of upright standards 19 having their upper ends extended rearwardly, said ends receiving therebetween the angle of a bell crank 20 having one of its arms provided with a downwardly and forwardly inclining link 21 having thereon an adjustable stop collar 23 and a coil spring 22 disposed in advance of said collar and bearing against the rear side of a crank arm 24 which is rigidly secured to the shaft 7 and rises therefrom, said arm being provided with a slot 25 through which the front end of the link 21 projects, such front end being provided with a nut 26 contacting with the front side of the crank arm as clearly disclosed in Fig. 1. By this arrangement of parts, it will be evident that actuation of the hand lever 16 to raise and lower the disks 10, will rock the bell crank 20, thereby causing additional subsoiling disks 10ª to be raised and lowered simultaneously with said disks 10, such disks 10ª being rotatably mounted on the forwardly and laterally extending stub axle which projects horizontally from the lower end of an upright shaft 27 slidable vertically in a bearing 28 secured to the rear end of the frame F, one arm of the bell crank 20 being pivotally and slidably connected to the upper end of the shaft 27.

The connection between the bell crank and the shaft 27 may be in any one of a number of forms, in order to allow the angular relation of the subsoiling disks 10ª to the direction of travel of the machine, to be varied, but the cap member 29 is preferably mounted rotatably upon the upper end of said shaft and is normally locked against such movement by a set screw or the like 30, the cap member being provided with a pair of upstanding ears 31 through which and through a slot in the bell crank, a pivot pin is passed.

I have hereinbefore described the fact that the disks 10 may yield upwardly in case obstructions are encountered, and that the disks 10ª are raised and lowered simultaneously with the raising and lowering of said disks 10 upon actuation of the hand lever 16, but since it is highly desirable to provide some means for allowing the rear disks 10ª to shift upwardly in case they are brought into contact with rocks or the like, the spring 22 has been provided. Thus it will be evident that the two sets of disks may shift upwardly independently of each other or simultaneously for preventing breakage of any parts of the machine due to contact of such disks with obstructions in their paths of travel, the path of the disks 10 being as heretofore set forth, while the disks 10ª travel directly in rear of the right hand plow of the gang, if the machine be a right hand plow, or directly in rear of the plow at the opposite side of the machine, if the latter be of the left hand type as seldom occurs.

When using a gang plow equipped as above described, in certain classes of soil, the disks 10 and 10ª do not operate as advantageously as ordinary shovel blades. It therefore becomes expedient to provide a horizontal shaft 7ª having a depending crank arm 8ª and carrying a shovel blade 10ᵇ, such shaft being adapted for substitution for the shaft 7, in which case a perforated ear 11ª will be carried by the crank arm 8ª for the reception of the front end of the link 13. Similarly, an upright shaft 27ª carrying at its lower end a shovel blade 10ᶜ may be substituted for the shaft 27.

The alternative construction just described, is depicted in Figs. 6, 7 and 8, and since the remaining features shown in these figures are identical with those previously described, it is thought that further descriptive matter by reference to the drawings is superfluous.

From the foregoing description, taken in connection with the accompanying drawings, it will be evident that although comparatively simple construction has been provided for carrying out the object of the invention, the attachment will be efficient and advantageous in operation, effectively loosening the earth in the several furrows, before soil from adjacent furrows is thrown thereinto.

I claim:—

1. In combination, a pair of vertically movable members carrying earth working implements, a lever for adjusting one member vertically, and detachable operating connections between said member and the other member including a yieldable element.

2. In combination, an upright vertically movable shaft carrying an earth working implement, a horizontal rock shaft likewise carrying an earth working implement, operating means for turning the rock shaft including a yieldable lever-actuated element, a crank arm on the rock shaft, a bell crank fulcrumed at a point spaced from said arm and pivoted at one end to the upright shaft, and a yieldable connection between the other end of the bell crank and the crank arm.

3. In combination, an upright shaft carrying an earth working implement, a horizontal rock shaft likewise carrying such an implement, operating means for turning the rock shaft to adjust the implement carried thereby vertically, a crank arm projecting from the rock shaft, a bell crank pivoted at one end to the upright shaft, and link means connecting the other end of said crank and the crank arm.

4. In combination, a portable frame, a horizontal rock shaft mounted thereon and having a depending implement carrying arm, an apertured ear movable with said depending arm, a lever fulcrumed to the frame in rear of the rock shaft, a link pivoted at its rear end to said lever and extending through the aperture in the aforesaid ear, a stop on the front end of the link abutting said ear, an additional stop on the link spaced in rear of the ear, a coiled spring interposed between said additional stop and said ear, a rigid crank arm rising from the rock shaft and having therein an aperture, a bell crank fulcrumed to the frame in rear of the rock shaft and having one of its arms extending upwardly from its fulcrum, a link pivoted at its rear end to said arm of the bell crank and having its front end inserted through the opening in the crank arm, a stop on said front end of the link in contact with the front side of said crank arm, an additional stop on the link spaced in rear of said crank arm, a coiled spring interposed between the latter and said additional stop, and an upright vertically movable implement carrying shaft mounted on the frame and having a sliding connection with the other arm of the bell crank.

In testimony whereof I have hereunto set my hand in presence of two subscribing witnesses.

JOHN A. BELTZ.

Witnesses:
H. STEINBERG,
LLOYD FRENCH.

Copies of this patent may be obtained for five cents each, by addressing the "Commissioner of Patents, Washington, D. C."